(12) United States Patent
Varadan

(10) Patent No.: US 11,989,097 B2
(45) Date of Patent: May 21, 2024

(54) CHUNK AND SNAPSHOT DELETIONS

(71) Applicant: HEWLETT PACKARD ENTERPRISE DEVELOPMENT LP, Houston, TX (US)

(72) Inventor: Srikant Varadan, San Jose, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 28 days.

(21) Appl. No.: 17/659,583

(22) Filed: Apr. 18, 2022

(65) Prior Publication Data
US 2023/0333939 A1 Oct. 19, 2023

(51) Int. Cl.
G06F 11/14 (2006.01)

(52) U.S. Cl.
CPC ...... *G06F 11/1453* (2013.01); *G06F 11/1458* (2013.01); *G06F 2201/84* (2013.01)

(58) Field of Classification Search
CPC ............. G06F 11/1453; G06F 11/1458; G06F 2201/84
See application file for complete search history.

(56) References Cited

U.S. PATENT DOCUMENTS

| | | |
|---|---|---|
| 9,317,525 B2 | 4/2016 | Zuckerman et al. |
| 9,773,016 B2 | 9/2017 | Srivas et al. |
| 10,318,495 B2 | 6/2019 | Talagala et al. |
| 10,360,261 B2 | 7/2019 | Zuckerman et al. |
| 10,983,868 B2 | 4/2021 | Lopez et al. |
| 2019/0377802 A1 | 12/2019 | Haber et al. |
| 2020/0026612 A1 | 1/2020 | Ben Dayan et al. |
| 2022/0091767 A1 | 3/2022 | Balakrishnan et al. |

OTHER PUBLICATIONS

Sage Weil, Scalable Archical Data and Metadata Management in Object-based File System, Jun. 2004, retrieved on Oct. 16, 2023, retrieved from the Internet <URL: https://citeseerx.ist.psu.edu/document?repid=rep1&type=pdf&doi=2dda924bcbd20a4e44c839549403206efbbfa2e8> (Year: 2004).*
Strzelczak et al., Concurrent Deletion in a Distributed Content-Addressable Storage System with Global Deduplication, Fast '13, 2013, retrieved on Oct. 16, 2023, retrieved from the Internet <URL: https://www.usenix.org/system/files/conference/fast13/fast13-final91.pdf> (Year: 2013).*

(Continued)

*Primary Examiner* — Tyler J Torgrimson
(74) *Attorney, Agent, or Firm* — Trop, Pruner & Hu, P.C.

(57) ABSTRACT

In some examples, a system maintains mapping metadata for data in storage, the data divided into chunks, the mapping metadata comprising chunk entries mapping chunk identifiers of the chunks to storage locations, wherein the chunk identifiers are monotonically increasing as chunks are created. The system updates an epoch in response to triggering a creation of a snapshot of the data. In response to a deletion of a first chunk, the system updates a first chunk entry for the first chunk to include a creation epoch identifier and a deletion epoch identifier for the first chunk. In response to a deletion of a first snapshot of the multiple snapshots, the system uses the creation epoch identifier and the deletion epoch identifier to determine whether to remove the first chunk entry from the mapping metadata.

19 Claims, 4 Drawing Sheets

(56) References Cited

OTHER PUBLICATIONS

Douglis et al., The Logic of Physical Garbage Collection in Deduplicating Storage, Fast 17, 2017, retrieved on Oct. 16, 2023, retrieved from the Internet <URL: https://www.usenix.org/system/files/conference/fast13/fast13-final91.pdf> (Year: 2017).*

Sarkar et al., "Lethe: A Tunable Delete-Aware LSM Engine," Jun. 2020, SIGMOD '20, Research 10: Storage and Indexing, pp. 893-908, <https://dl.acm.org/doi/pdf/10.1145/3318464.3389757>, 16 pages.

Sarkar et al., "Lethe: Enabling Efficient Deletes in LSMs," Aug. 8, 2020, website, <https://web.archive.org/web/20200808142038/https://disc-projects.bu.edu/lethe/>, 9 pages.

Hewlett-Packard Development Company, L.P., "HP X9000 File System Software Snapshots," Application Note for X9000 File Serving Software 6.0 or later, Edition 1, 2011, 12 pages.

IBM Corporation, "Removing tombstones in Cassandra," Mar. 1, 2021, <https://www.ibm.com/docs/en/b2b-integrator/5.2?topic=cassandra-removing-tombstones-in>, 2 pages.

The Apache Software Foundation, "Compaction," Cassandra Documentation, Jan. 24, 2022, <https://web.archive.org/web/20220124072458/https://cassandra.apache.org/doc/latest/cassandra/operating/compaction/index.html>, 12 pages.

* cited by examiner

CHUNK AND SNAPSHOT DELETIONS

BACKGROUND

A storage system can be used to store data. In some cases, a storage system can be an object-based storage system in which data is stored as objects. Objects can in turn be divided into chunks. In some cases, data deduplication can be applied to reduce or eliminate the occurrences of duplicative chunks being stored in a storage system.

BRIEF DESCRIPTION OF THE DRAWINGS

Some implementations of the present disclosure are described with respect to the following figures.

Figure 1:
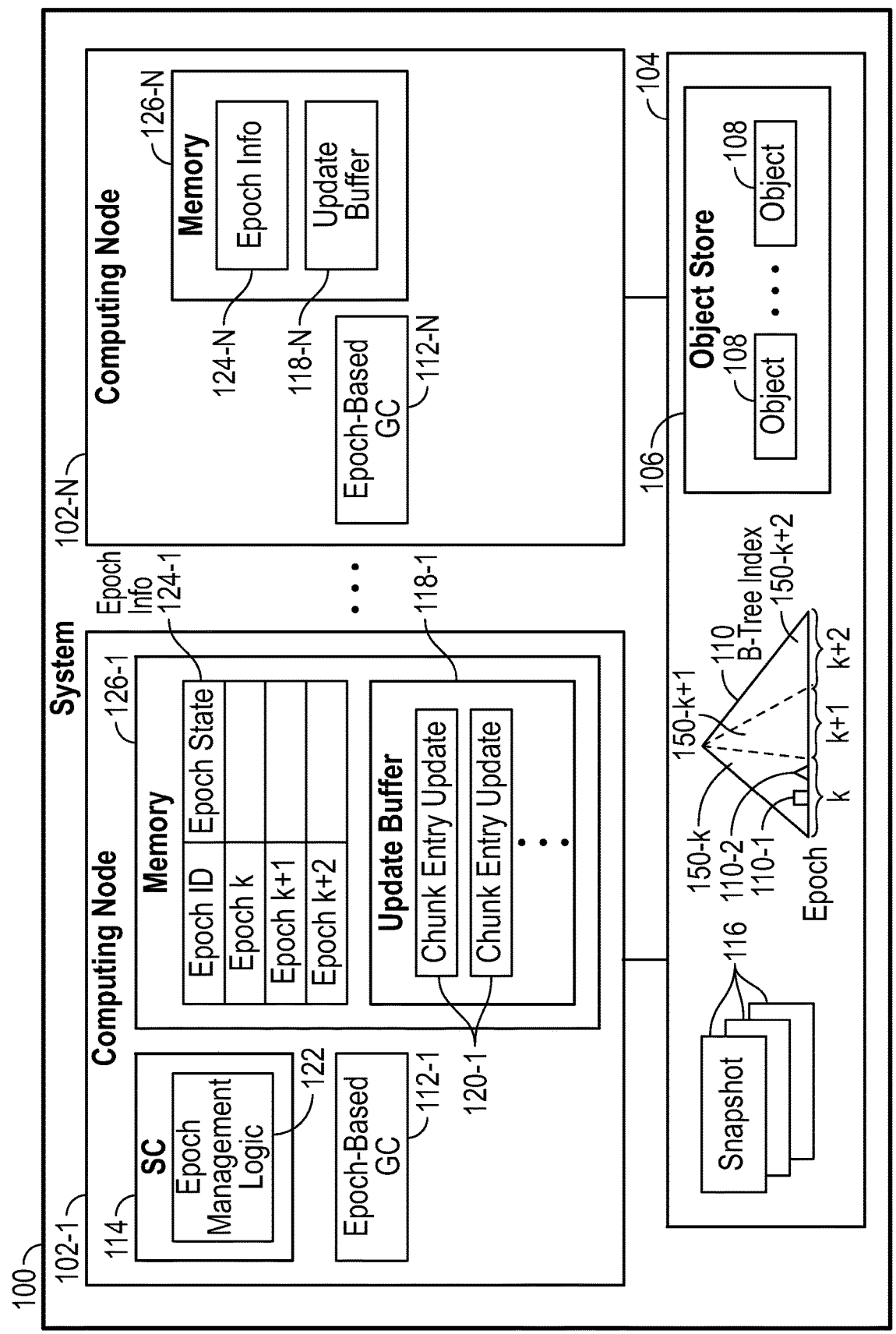
FIG. 1 is a block diagram of an arrangement that includes a cluster of computing nodes and a shared storage pool, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used here, the term "object" can refer to any identifiable unit of data. For example, the object can be identified using an object identifier, an object name, a uniform resource identifier (URI), or any other type of identifier.

An "object store" refers to a data repository of objects. A data repository can refer to any logical or physical storage arrangement or data.

An object can be divided into a collection of chunks, where a collection of chunks can include a single chunk or multiple chunks. A "chunk" can refer to any segment of a larger piece of data.

In some examples, an index can be used to map chunk identifiers to storage locations in storage where respective chunks identified by the chunk identifiers are stored.

In some examples, the index can be in the form of a tree data structure, such as a B-tree. A B-tree index can include chunk entries that map chunk identifiers to respective storage locations in storage where respective chunks are stored. Each chunk entry of the B-tree index can include a key-value pair; the key can be the chunk identifier and the value is the corresponding storage location. In such examples, the B-tree index is in the form of a key-value store.

Although reference is made to a B-tree index as an example of index that can be used to map chunk identifiers to storage locations, in other examples, other types of indices can be used. More generally, mapping metadata that maps chunk identifiers to storage locations of chunks can be employed.

A "chunk identifier" can refer to any value that is used to identify a chunk so that the chunk can be distinguished from another chunk.

In some examples of the present disclosure, chunk identifiers are monotonically increasing as chunks are written to a storage system. In other words, as each new chunk (after a first chunk) is written to the storage system, the new chunk is assigned a respective chunk identifier having an incremented value (incremented by some specified value, e.g., 1 or a different value) relative to a respective chunk identifier of a chunk written to the storage system immediately before the new chunk. In such examples, each successive chunk identifier assigned to a respective chunk written to the storage system is greater than each of the chunk identifiers assigned to previously written chunks. In such examples, a later written chunk may not be assigned a chunk identifier having a lower value than a previously written chunk. In this manner, successive chunk identifiers generated for new chunks may not decrease in value relative to one another.

As incoming data is received to be written to a storage system, the index can be used to check to determine whether any chunks of the incoming data are already stored in the storage system. If so, as part of a data deduplication process, duplicative chunks of the incoming data are not stored again in the storage system. Rather, references to such duplicative chunks are stored, and a reference count can also the incremented to indicate the number of instances of each chunk that has been received.

To provide for the ability to recover from data failures, snapshots of data can be taken. A "snapshot" refers to a point-in-time copy of data. As an example, a snapshot can be taken of a collection of volumes (one volume or multiple volumes). A "volume" can refer to a logical unit of data that can contain a collection of objects (e.g., one object or multiple objects, or portion(s) of object(s)). A snapshot of a collection of volumes taken at time t contains a version of the data in the collection of volumes that existed at time t.

In some examples, a snapshot does not store data, but rather can include references to chunks stored in the storage system. A "reference" to a chunk contained in a snapshot can include the chunk identifier of the chunk. Different snapshots can be taken at different points in time. When a failure or error is detected and a system performs a recovery process to recover data that existed at a given point in time, a snapshot corresponding to the given point in time can be used to perform the recovery.

Snapshots taken at different points in time can share some references to chunks. For example, snapshot S1 taken at time t1 can include references to chunks C1, C2, and C3. If chunk C3 was deleted after time t1 but before time t2, then snapshot S2 taken at time t2 can include references to chunks C1 and C2. In this example, snapshots S1 and S2 share references to chunks C1 and C2.

As objects are deleted in a storage system (e.g., due to requests from users, programs, or machines), corresponding chunks of the objects can also be deleted. However, an issue associated with a storage system that employs snapshots is that the snapshots can also refer to the chunks. As a result, even though chunks are deleted as a result of corresponding objects being deleted, such deleted chunks should not be removed from the storage system if the chunks are referred to by any snapshot. In some examples, deleted chunks can be marked for removal by a garbage collection process of the storage system. A "garbage collection" process can refer to a process in which unused data is removed to free up storage capacity of the storage system.

As used here, deletion of a chunk refers to marking such chunk for deletion. The deleted chunk (i.e., the chunk marked for deletion) is still stored in the storage system (and moreover, metadata associated with such deleted chunk can remain stored), where the metadata can be part of a B-tree index, for example. Thus, if a recovery operation were to be performed using a snapshot that refers to a deleted chunk, the chunk is still available to perform the recovery operation.

Removing a deleted chunk refers to freeing the storage location occupied by the chunk, removing a reference to the chunk, or the like, such that the chunk is no longer accessible within the storage system (e.g., via the data structures of the storage system). Removal of chunks can be performed by a garbage collection process. The determination of whether or not deleted chunks can be removed during the garbage collection process may in some cases be inefficient, since the garbage collection process may have to perform a potentially time consuming search to determine whether or not any snapshots or other data containers refer to the deleted chunks.

In accordance with some implementations of the present disclosure, to efficiently remove chunks such as during a garbage collection process, epochs associated with snapshots are used. The epochs can track whether or not deleted chunks are shared by any snapshots. These epochs can be used to more efficiently remove deleted chunks.

In accordance with some examples of the present disclosure, as chunks of data are being deleted, respective chunk entries of metadata in mapping metadata (e.g., a B-tree index) are updated for the deleted chunks by adding deletion markers (also referred to as "tombstones" herein).

In some examples, a deletion marker can include a deletion epoch identifier. Each chunk entry further includes a creation epoch identifier. When a snapshot is deleted, the chunk entries with deletion markers (e.g., deletion epoch identifiers) are checked to determine whether they can be removed; this check determines whether the corresponding chunks are not shared by any live snapshot in the system (a "live snapshot" is a snapshot that has not been deleted or otherwise indicated as invalid).

An "epoch" represents a logical time associated with the taking of snapshots. As snapshots are taken, a current epoch rolls over to a next epoch. To that end, epoch identifiers monotonically increase as epochs roll over due to snapshot creation. Each epoch can include or can be associated with epoch metadata, including epoch state information and a range of chunk identifiers (discussed further below).

Techniques or mechanisms according to some implementations of the present disclosure are applied in a context where snapshots refer to chunks that are immutable (i.e., chunks can be deleted but they cannot be overwritten with modified chunks).

1. System Arrangement

FIG. 1 is a block diagram of an example system 100 that includes a cluster of computing nodes 102-1 to 102-N, where N≥1. Although FIG. 1 shows multiple computing nodes (e.g., N>1) in the system 100, in other examples, just a single computing node (e.g., N=1) can be provided in the system 100.

The computing nodes 102-1 to 102-N are coupled, such as over a network, to a shared storage pool 104. The network over which a computing node is able to communicate with the shared storage pool 104 can include a storage area network (SAN), a local area network (LAN), a wide area network (WAN), and so forth.

The shared storage pool 104 includes a collection of storage devices (a single storage device or multiple storage devices). Each storage device can be implemented as a disk-based storage device, a solid state drive, or any other suitable type of storage device.

The shared storage pool 104 can store an object store 106 that contains various objects 108 in response to writes from the computing nodes in 102-1 to 102-N.

In some examples, the object store 106 can be in the form of a log-structured file system (LFS), in which objects and associated metadata can be written sequentially into a log. In other examples, the object store 106 can have other forms.

The shared storage pool 104 can also store a B-tree index 110 that contains mapping metadata for chunks of the objects 108 in the object store 106. The B-tree index 110 has leaf nodes that contain chunk entries. The leaf nodes of the B-tree index 110 are the nodes at the bottom of the hierarchy of the tree structure of the B-tree index (i.e., each leaf node does not have any child nodes). A leaf node can include multiple chunk entries, where each chunk entry maps a chunk identifier to a storage location in the object store 106. The storage location can be in the form of an address, an offset, and so forth.

The B-tree index 110 has a root node at the top of the hierarchy of the tree structure of the B-tree index 110. The root node contains pointers to child nodes of the root node, and each non-leaf node in the B-tree index 110 in turn contains pointers to child nodes of the non-leaf node. A "non-leaf node" refers to a node in the tree structure of the B-tree index 110 that is not a leaf node. The lowest level non-leaf nodes in the B-tree index 110 have pointers to leaf nodes in the B-tree index 110.

Although examples refer to mapping metadata arranged in the form of the B-tree index 110, it is noted that in other examples, the mapping metadata containing chunk entries can be in a different form (e.g., a mapping table, a file, etc.).

In accordance with some examples of the present disclosure, two different types of chunk entries can be present in the B-tree index 110, and more specifically, in leaf nodes of the B-tree index 110. A first type of chunk entry is referred to as a "regular" chunk entry, such as a regular chunk entry 110-1. A second type of chunk entry in the B-tree index 110 is a tombstone entry, such as a tombstone entry 110-2.

A regular chunk entry is associated with a chunk that is stored in the object store 106 and which has not been deleted. A tombstone entry is associated with a chunk that has been deleted, but not yet removed from the object store 106. The removal of a deleted chunk can be performed by a garbage collector, such as any of epoch-based garbage collectors 112-1 to 112-N in the respective the computing nodes 102-1 to 102-N.

Removing a chunk can refer to removing the chunk from the object store 106 and removing metadata associated with the chunk from the mapping metadata (e.g., in the form of the B-tree index 110), such that the chunk and the associated metadata are no longer stored in the storage pool 104.

Differences between the regular chunk entry 110-1 and the tombstone entry 110-2 are discussed further below.

Snapshots 116 can also be taken of data in the object store 106. In some examples, the object store 106 can include volumes of data, where each volume can include a collection of objects 108. Each snapshot 116 can refer to data of a collection of volumes.

The taking of snapshots can be controlled by a snapshot controller (SC) 114 in the computing node 102-1. In some examples where multiple computing nodes are present in the system 100, one of the computing nodes can be designated or elected as a leader computing node. Any of the computing nodes of the cluster of computing nodes 102-1 to 102-N can be designated or elected as the leader computing node.

The leader computing node 102-1 can be responsible for taking snapshots of data in the object store 106. In other examples, each of the computing nodes 102-1 to 102-N (including non-leader computing nodes) can include a snapshot controller to take snapshots of data in the object store 106.

The snapshots 116 taken by the snapshot controller 114 are taken by the snapshot controller 114 at different points in time. Thus, each snapshot 116 corresponds to a version of data in a collection of volumes at a respective point in time.

The computing nodes 102-1 to 102-N further include respective update buffers 118-1 to 118-N, which are stored in respective memories 126-1 to 126-N in the corresponding computing nodes 102-1 to 102-N. Each update buffer is a storage structure to store data (including the chunk entry updates) as chunks are received. Although referred to in the singular sense, an "update buffer" can include multiple buffers.

A memory in a computing node can be implemented using a collection of memory devices (a single memory device or multiple memory devices). Examples of memory devices can include any or some combination of the following: a dynamic random access memory (DRAM) device, a static random access memory (SRAM) device, a flash memory device, and so forth.

Each update buffer 118-$i$ ($i=1$ to N) is used to store chunk entry updates that are associated with chunks of incoming data to be written to the object store 106. Incoming data refers to data to be written to the object store 106. The incoming data can be associated with write requests issued by requesters (e.g., users, programs, or machines) that can communicate with the system 100 over a network, or alternatively, can be part of the system 100.

A chunk entry update includes mapping metadata associated with a chunk to be written to the object store 106. A chunk entry update can include a chunk identifier mapped to a respective storage location in the object store 106. In the example of FIG. 1, the update buffer 118-1 includes chunk entry updates 120-1 that are associated with respective chunks to be written to the object store 106. The update buffer 118-N similarly includes chunk entry updates. The chunk entry updates in each update buffer 118-$i$ is to be merged into the B-tree index 110 by the corresponding computing node 102-$i$.

As noted above, each snapshot can be associated with a corresponding epoch. The creation of epochs is performed by epoch management logic 122, which can be part of the snapshot controller 114 in some examples. In other examples, the epoch management logic 122 can be separate from the snapshot controller 114.

In some examples, each of the epoch-based garbage collectors 112-1 to 112-N and the snapshot controller 114 can be implemented using one or more hardware processing circuits in the respective computing node, or using a combination of machine-readable instructions executable on the one or more hardware processing circuits in the respective computing node. A hardware processing circuit can include any or some combination of a microprocessor, a core of a multi-core microprocessor, a microcontroller, a programmable integrated circuit, a programmable gate array, or another hardware processing circuit.

The epoch management logic 122 can create and update epoch information, including epoch information 124-1 to 124-N stored in the respective memories 126-1 to 126-N.

The epoch information 124-1 can include a collection of epoch identifiers to identify corresponding epoch. The epoch information 124-1 associates each identified epoch with corresponding epoch state information. In some examples, an epoch can have one of several different states: an unprotected state, an in-progress state, a protected state, and a deleted state.

The epoch information 124-N includes similar information.

2. Epochs

Figure 2:
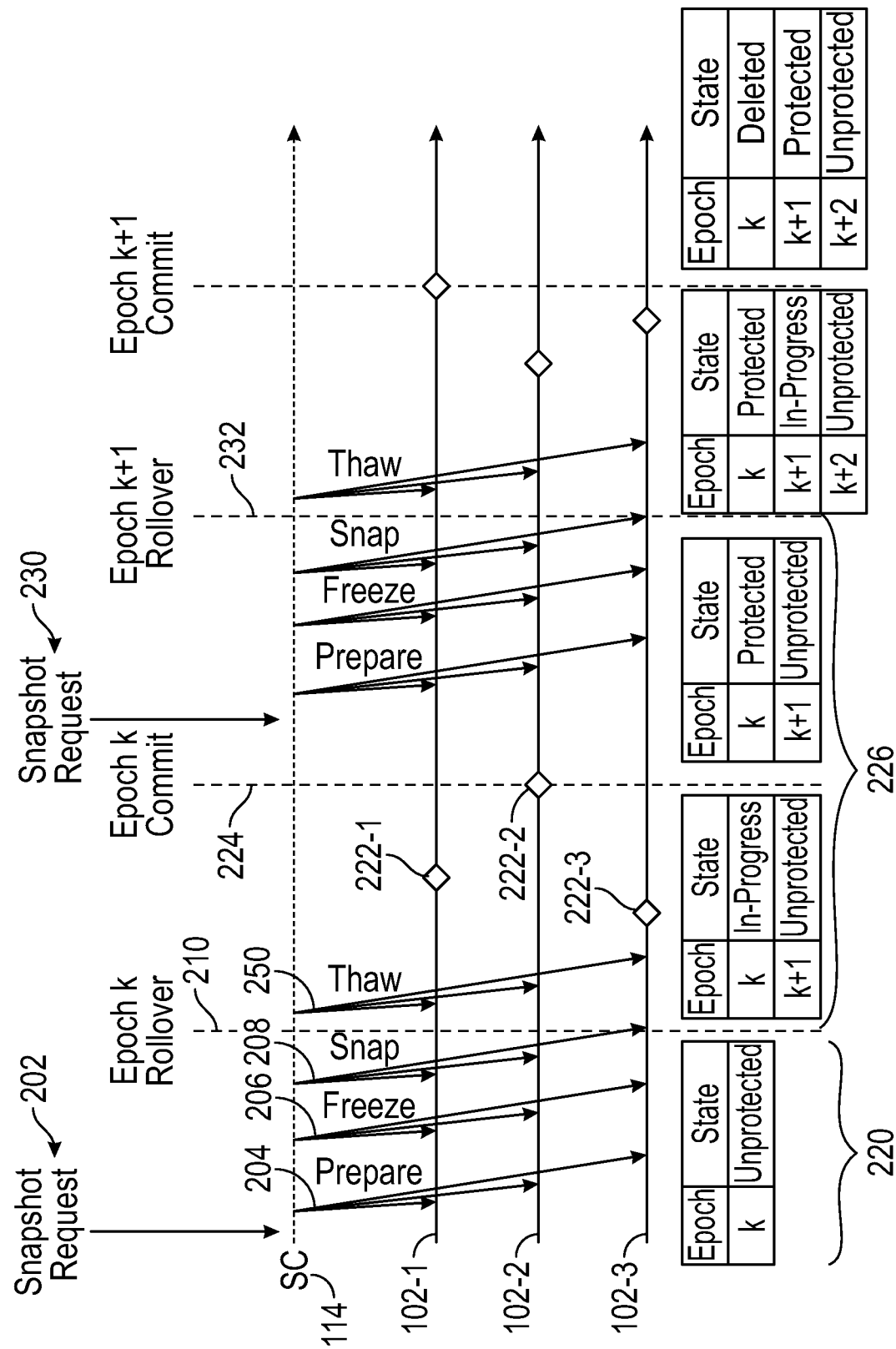
FIG. 2 is a graph illustrating creations of epochs as data snapshots are taken, according to some examples.

As further shown in FIG. 2, in response to a snapshot request 202 to take a snapshot (create a snapshot), the snapshot controller 114 can instruct each of computing nodes 102-1 to 102-3 in the cluster of computing nodes (assuming three computing nodes in the example) to prepare (quiesce) (204) the computing node's instance of the object store 106, freeze (206) the instance of the object store 106, and then execute the snapshot (208).

At the time that the snapshot request 202 is received in a time interval 220, epoch k ($k \geq 1$) is the current epoch. Epoch k is associated with snapshot k that is to be created by the snapshot request 202.

In the time interval 220, the epoch state for epoch k is the unprotected state. In the unprotected state, the epoch k is able to receive writes of chunks and updates of associated mapping metadata for the chunks. An epoch receiving writes of chunks and updates of associated metadata refers to a condition in which the object store 106 and the B-tree index 110 are updated in response to data writes, and such updated data and associated metadata are to be included in the next snapshot to be created. In other words, an epoch k in the unprotected state can receive writes of chunks and updates of associated mapping metadata that are to be included in snapshot k to be created in response to the snapshot request 202.

Quiescing an instance of the object store 106 can refer to completing any in-progress writes at the corresponding computing node. Freezing an instance of the object store 106 can refer to declining to accept any write requests to the object store 106. Executing the snapshot can refer to creating a portion of the snapshot by the computing node 102-$i$.

As each computing node completes the creation of its portion of the snapshot, the computing node can provide a completion response to the snapshot controller 114. After receiving the completion response of the last computing node to respond to the snapshot request 202, the current epoch (epoch k) is rolled over (at 210) to the next epoch (epoch k+1).

In response to the rollover from epoch k to epoch k+1, the epoch state of epoch k is transitioned from the unprotected state to the in-progress state, and the epoch state for epoch k+1 is set at the unprotected state.

In the in-progress state of epoch k, any chunks (such as chunks in a write cache, not shown, in a computing node 102-$i$) and associated metadata (in the update buffer 126-$i$) updated during the time interval 220 are synchronized by the computing node 102-$i$ to the object store 106 and the B-tree index 110, respectively, in the storage pool 104.

Once the rollover is complete, the requested snapshot has been created and writes can now resume, as indicated by thawing (250) the instance of the object store 106.

Once the chunks and associated metadata have been synchronized by the computing node 102-*i* to the storage pool 104, the computing node 102-*i* has committed its updates to persistent storage (in the storage pool 104) for epoch k, which is indicated by a respective checkpoint 222-*i*. The checkpoint 222-1 indicates the time at which the computing node 102-1 committed its updates for epoch k to the storage pool 104, the checkpoint 222-2 indicates the time at which the computing node 102-2 committed its updates for epoch k to the storage pool 104, and the checkpoint 222-3 indicates the time at which the computing node 102-3 committed its updates for epoch k to the storage pool 104.

The time at which the last computing node commits its updates for epoch k is considered the point at which epoch k has been committed, represented as 224. In the example of FIG. 2, the computing node 102-2 is the last to commit its updates for epoch k, and thus the time of the checkpoint 222-2 is the time at which epoch k committed.

Snapshot k for epoch k refers to the chunks committed for epoch k by the computing nodes 102-1 to 102-3. After epoch k has been committed, the epoch state of epoch k is transitioned to the protected state.

In a time interval 226 that is immediately after the time interval 220, epoch k+1 is in the unprotected state.

As further shown in FIG. 2, another snapshot request 230 is received by the snapshot controller 114 during time interval 226, which triggers a similar set of actions as discussed above for epoch k. In response to the snapshot request 230, epoch k+1 is rolled over to epoch k+2 (at 232).

As noted above, chunk identifiers monotonically increase as chunks are written to the object store 106. In some examples of the present disclosure, chunks are chunks are immutable (i.e., chunks can be deleted but they cannot be overwritten with modified chunks). As a result of the immutable characteristic of chunks, metadata for new chunks are added to the right edge of the B-tree index 110, and removed chunks will not come back.

Also, since the chunk identifiers monotonically increase, as chunk entries are added to the right edge of the B-tree index 110, the added chunk entries have continually increasing chunk identifiers. Thus, in some examples, a later added chunk entry that is to the right of an earlier added chunk entry will have a larger chunk identifier that the earlier added chunk entry.

As a result of this chunk identifier pattern in chunk entries added to the B-tree index 110, the chunk identifiers can be partitioned by epochs. In FIG. 1, epoch k has a range of chunk identifiers in segment 150-*k* of the B-tree index 110, epoch k+1 has another range of chunk identifiers in segment 150-*k*+1 of the B-tree index 110, and epoch k+2 has yet another range of chunk identifiers in segment 150-*k*+2 of the B-tree index 110. The range of chunk identifier of any epoch is distinct from and does not overlap the range of chunk identifier of any other epoch.

The range of chunk identifiers for each epoch x can be defined by a maximum chunk identifier. Since the maximum chunk identifier of the previous epoch x−1 is known, the range of chunk identifiers for epoch x can simply defined with one value (i.e., the maximum chunk identifier for epoch x). In such examples, the range of chunk identifiers for epoch x starts at the next chunk identifier immediately following the maximum chunk identifier of epoch x−1, and ends at the maximum chunk identifier for epoch x. Effectively, the maximum chunk identifiers identify the boundaries of the chunk identifier ranges for the different epochs.

In other examples, a range of chunk identifiers for each epoch x can be defined by a minimum chunk identifier and a maximum chunk identifier.

In the B-tree index 110, each regular chunk entry (e.g., 110-1 in FIG. 1) for a chunk that is written but not deleted can include the following information, in some examples:

Chunk_ID→{Storage Location, Creation_epoch, Size, Checksum}.

"Chunk_ID" represents the chunk identifier of a chunk, "Storage Location" represents the storage location of the chunk in the object store 106, "Creation_epoch" represents the epoch in which the chunk entry was created in response to adding a respective chunk, "Size" represents the size of the chunk entry, and Checksum represents a checksum computed based on content in the chunk entry, where the checksum can be used to detect if an error is present in the chunk entry when the chunk entry is read.

As an existing chunk is deleted, the regular chunk entry for the existing chunk is converted to a tombstone entry (e.g., 110-2 in FIG. 1).

A tombstone entry contains the following information, in some examples.

Chunk_ID→{Storage Location, Creation_epoch, Deletion_epoch, Size, Checksum}.

In the tombstone entry, a "Deletion_epoch" has been added, which is a deletion marker that indicates that the chunk entry is a tombstone entry. "Deletion_epoch" represents the epoch in which a respective chunk is deleted (or more precisely, the epoch in which the respective chunk was requested to be deleted but has not yet been removed).

For example, if a given chunk was added to the object store in epoch k (during time interval 220 in FIG. 2), then Creation_epoch is set to epoch k (the identifier of epoch k). If the given chunk is later deleted in epoch k+n (where n≥1), then Deletion_epoch is set to epoch k+n (the identifier of epoch k+n). Note that it is possible that the given chunk is deleted in the same epoch in which the given chunk was added to the object store 106, in which case the Creation_epoch and the Deletion_epoch will have the same value.

A regular chunk entry for a given chunk differs from a tombstone entry for the given chunk in that the regular chunk entry does not include a deletion epoch identifier. A chunk entry that does not include a deletion epoch identifier can refer to the chunk entry omitting an information element for the deletion epoch identifier, or alternatively, can refer to the chunk entry not having a valid value for the deletion epoch identifier.

3. Garbage Collection

A garbage collection process can be triggered in response to a deletion of a snapshot. The deletion of a snapshot can be in response to a request from a user or another entity, in response to an application of a retention policy, and so forth. For example, the retention policy can specify that snapshots older than a specified time can be deleted.

In accordance with some implementations of the present disclosure, the garbage collection process can be performed by the epoch-based garbage collector 112-*i* of each computing node 102-*i*.

The tombstone entries in the B-tree index 110 can be used by each epoch-based garbage collector 112-*i* to identify snapshots that share references to the deleted chunks before removing the deleted chunks from the B-tree index 110.

The epoch-based garbage collector 112-*i* can determine which chunks having tombstone entries may be removed from the B-tree index 110.

The inputs used by the epoch-based garbage collector 112-*i* are as follows: P representing the predecessor epoch (having the protected state or the in-progress state) that is immediately prior to the epoch associated with the snapshot that is deleted, and S representing the successor epoch (having the protected state or the in-progress state) immediately following the epoch associated with the snapshot that is deleted.

The epoch-based garbage collector 112-i traverses a subset of the B-tree index 110 starting in a chunk entry having a chunk identifier equal the maximum chunk identifier of epoch P and ending at the maximum chunk identifier of epoch r (where epoch r is associated with snapshot r that is being deleted). In this manner, the epoch-based garbage collector 112-i examines just the chunk entries from the maximum chunk identifier of epoch r being deleted to the maximum chunk identifier of epoch P (the predecessor epoch), which reduces the search time in the B-tree index 110 for identifying chunk entries to remove during garbage collection, thereby improving the garbage collection efficiency.

In some examples of the present disclosure, the decision of whether or not to remove a tombstone entry having Creation_epoch=C and Deletion_epoch=D is as follows:

IF (C>P) AND (D≤S): remove the tombstone entry from the B-tree index 110;

ELSE: skip and do not remove the tombstone entry.

The above criterion specifies that if the Creation_epoch (C) of the tombstone entry is greater than the predecessor epoch (P), and the Deletion_epoch (D) of the tombstone entry is less than or equal to the Successor epoch, then the tombstone entry can be deleted. If the above criterion, (C>P) AND (D≤S), is satisfied, then that indicates that no snapshot other than the snapshot being deleted shares the chunk associated with the tombstone entry.

The following provides an example sequence of events.

Time T1: Chunk 1000 is written to the object store 106 in epoch k (i.e., Creation_epoch=k).

After time T1: A series of epoch rollovers occur, resulting in advancing epochs to a current epoch k+n.

Time T2: A deletion request is issued for chunk with chunk identifier 1000, which was written at T1. As a result of the deletion request, the regular chunk entry for chunk with chunk identifier 1000 is converted to a tombstone entry by adding Deletion_epoch set to current epoch k+n.

Time T3: Snapshot k associated with epoch k is deleted. In an example, a most recent predecessor epoch in the protected or in-progress state is epoch k−1, and a least recent successor epoch in the protected or in-progress state is epoch k+2. The most recent predecessor epoch to epoch k is the closest epoch before epoch k that is in the protected or in-progress state. The least recent successor epoch to epoch k is the earliest epoch after epoch k that is in the protected or in-progress state. In this example, it is assumed that epoch k+1 is not in the protected or in-progress state (e.g., epoch k+1 may have been deleted and thus is in a deleted state).

In an example, it is assumed that n>2 so that the current epoch is epoch k+3 or later. In examining the tombstone entry created at time T2 the garbage collector 112-i can determine that the creation epoch k for chunk with chunk identifier 1000 is greater than the predecessor epoch k−1 (C>P is satisfied), but the deletion epoch k+n is greater than the successor epoch k+2 (i.e., the condition D≤S is not satisfied). This indicates that the chunk is shared by all snapshots associated with epochs starting at epoch k+2 and ending at epoch k+n−1. Hence, the garbage collector 112-i does not remove chunk with chunk identifier 1000 and the tombstone entry associated with chunk with chunk identifier 1000 since other snapshots share the chunk with chunk identifier 1000.

In a different example, it is assumed that n=2 so that the current epoch is epoch k+2. In this case, the garbage collector 112-i can determine that the creation epoch k for chunk with chunk identifier 1000 is greater than the predecessor epoch k−1 (C>P is satisfied), and the deletion epoch k+2 is equal to the successor epoch k+2 (i.e., the condition D≤S is satisfied). This indicates that chunk with chunk identifier 1000 is not referenced by any existing snapshot.

Generally, if C>P is not satisfied, that means that the creation epoch of the tombstone entry is less than or equal to P, which indicates that at least epoch P (and possibly other epoch(s) earlier than epoch P) refer to chunk with chunk identifier 1000 associated with the tombstone entry, so that the chunk with chunk identifier 1000 cannot be removed.

If the condition D≤S is not satisfied, that means that the deletion epoch in the tombstone entry is greater than S, which indicates that chunk with chunk identifier 1000 associated with the tombstone entry was deleted after epoch S and thus is shared by snapshots associated with epochs starting at epoch S and ending at epoch k+n−1 (one less than the current epoch), so that the chunk with chunk identifier 1000 cannot be removed.

4. Further Implementations

Figure 3:
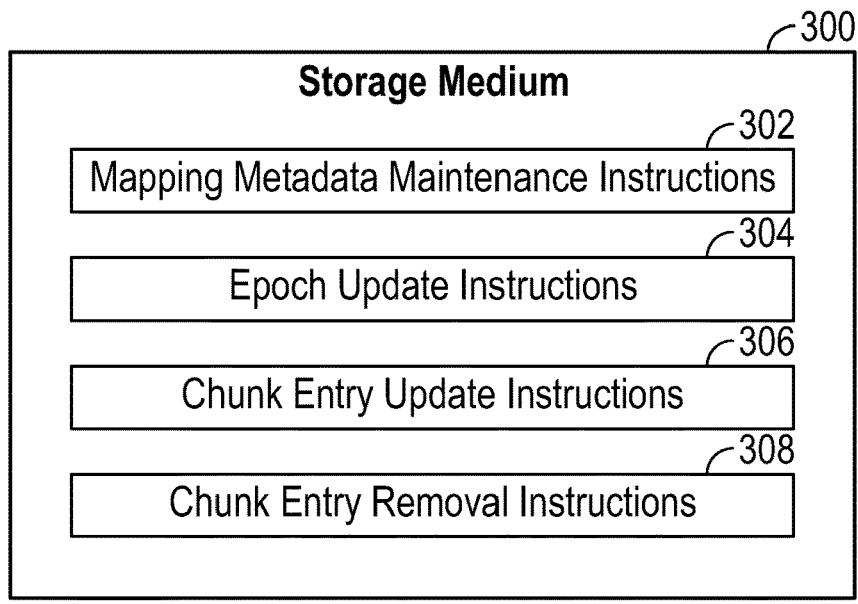
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution (e.g., by one or more hardware processing circuits) cause a system to perform various tasks. The system can include a computer or multiple computers.

The machine-readable instructions include mapping metadata maintenance instructions 302 to maintain mapping metadata (e.g., the B-tree index 110 of FIG. 1) for data in storage (e.g., the object store 106 in the storage pool 104). The data is divided into chunks, and the mapping metadata includes chunk entries mapping chunk identifiers of the chunks to storage locations (e.g., of the object store 106). The chunk identifiers are monotonically increasing as chunks are created.

The machine-readable instructions include epoch update instructions 304 to update an epoch in response to triggering a creation of a snapshot of the data. Updating the epoch can refer to changing a state of the epoch, and rolling over the epoch to a next epoch. In some examples, epochs are associated with respective snapshots, and epochs have identifiers that are monotonically increasing as epoch rollovers occur.

The machine-readable instructions include chunk entry update instructions 306 to, in response to a deletion of a first chunk, update a first chunk entry for the first chunk to include a creation epoch identifier and a deletion epoch identifier for the first chunk, the first chunk entry being part of the chunk entries in the mapping metadata. The creation epoch identifier identifies an epoch in which the first chunk was created, and the deletion epoch identifier identifies an epoch in which the first chunk was deleted.

The machine-readable instructions include chunk entry removal instructions 308 to, in response to a deletion of a first snapshot of the multiple snapshots, use the creation epoch identifier and the deletion epoch identifier to determine whether to remove the first chunk entry from the mapping metadata. The creation epoch identifier and the deletion epoch identifier can be used to determine whether any snapshot refers to the first chunk. If any snapshot refers to the first chunk, then removal of the first chunk is prevented. If no snapshot refers to the first chunk, then removal of the first chunk is allowed.

In some examples, the mapping metadata is part of a tree-structured index having a root node and leaf nodes, and the leaf nodes contain the chunk entries. Removing the first chunk entry from the mapping metadata includes removing the first chunk entry from a leaf node of the tree-structured index.

In some examples, the tree-structured index is divided into plural segments associated with respective epochs, where each segment of the tree-structured index includes chunk entries with chunk identifiers within a respective range of chunk identifiers.

In some examples, using the creation epoch identifier and the deletion epoch identifier to determine whether to remove the first chunk entry from the mapping metadata includes comparing the creation epoch identifier to a predecessor epoch identifier identifying a predecessor epoch of a first epoch associated with the first snapshot that is being deleted, and comparing the deletion epoch identifier to a successor epoch identifier identifying a successor epoch of the first epoch associated with the first snapshot that is being deleted.

In some examples, each of the first epoch and the predecessor epoch has a respective range of chunk identifiers. The machine-readable instructions can, in response to the deletion of the first snapshot, traverse, to identify tombstone entries to remove, a subset of the mapping metadata starting from an end of the range of chunk identifiers of the predecessor epoch to an end of the range of chunk identifiers of the first epoch. For improved efficiency, the machine-readable instructions do not traverse other subsets of the mapping metadata to identify tombstone entries to remove in response to the deletion of the first snapshot.

Figure 4:
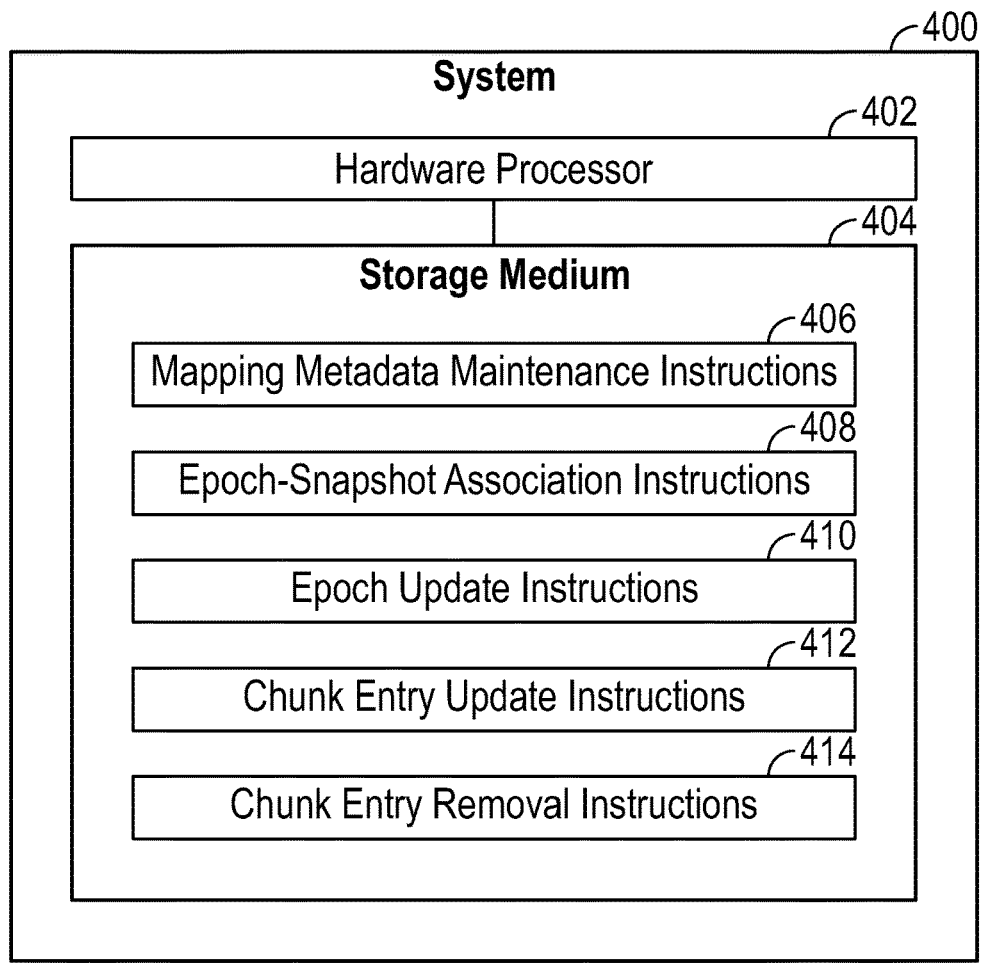
FIG. 4 is a block diagram of a system according to some examples.

FIG. 4 is a block diagram of a system 400 that includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions executable on the one or more hardware processors 402 to perform various tasks. Machine-readable instructions executable on a hardware processor can refer to the instructions executable on a single hardware processor or the instructions executable on multiple hardware processors.

The machine-readable instructions in the storage medium 404 include mapping metadata maintenance instructions 406 to maintain mapping metadata for data in storage, the data divided into chunks, the mapping metadata including chunk entries mapping chunk identifiers of the chunks to storage locations, where the chunk identifiers are monotonically increasing as chunks are created.

The machine-readable instructions in the storage medium 404 include epoch-snapshot association instructions 408 to associate epochs with respective snapshots of the data, where each epoch of the epochs includes epoch metadata including a respective range of chunk identifiers and an epoch state.

The machine-readable instructions in the storage medium 404 include epoch update instructions 410 to update a current epoch of the epochs in response to triggering a creation of a snapshot of the data, the snapshot comprising a point-in-time representation of data, where updating the current epoch includes triggering a commitment of data updates of the current epoch to the storage, and rolling over to a next epoch.

The machine-readable instructions in the storage medium 404 include chunk entry update instructions 412 to, in response to a deletion of a first chunk, update a first chunk entry for the first chunk to include a creation epoch identifier and a deletion epoch identifier for the first chunk, the first chunk entry being part of the chunk entries in the mapping metadata, the creation epoch identifier identifying an epoch in which the first chunk was created, and the deletion epoch identifier identifying an epoch in which the first chunk was deleted.

The machine-readable instructions in the storage medium 404 include chunk entry removal instructions 414 to, in response to a deletion of a first snapshot of the snapshots, use the creation epoch identifier and the deletion epoch identifier to determine whether to remove the first chunk entry from the mapping metadata.

Figure 5:
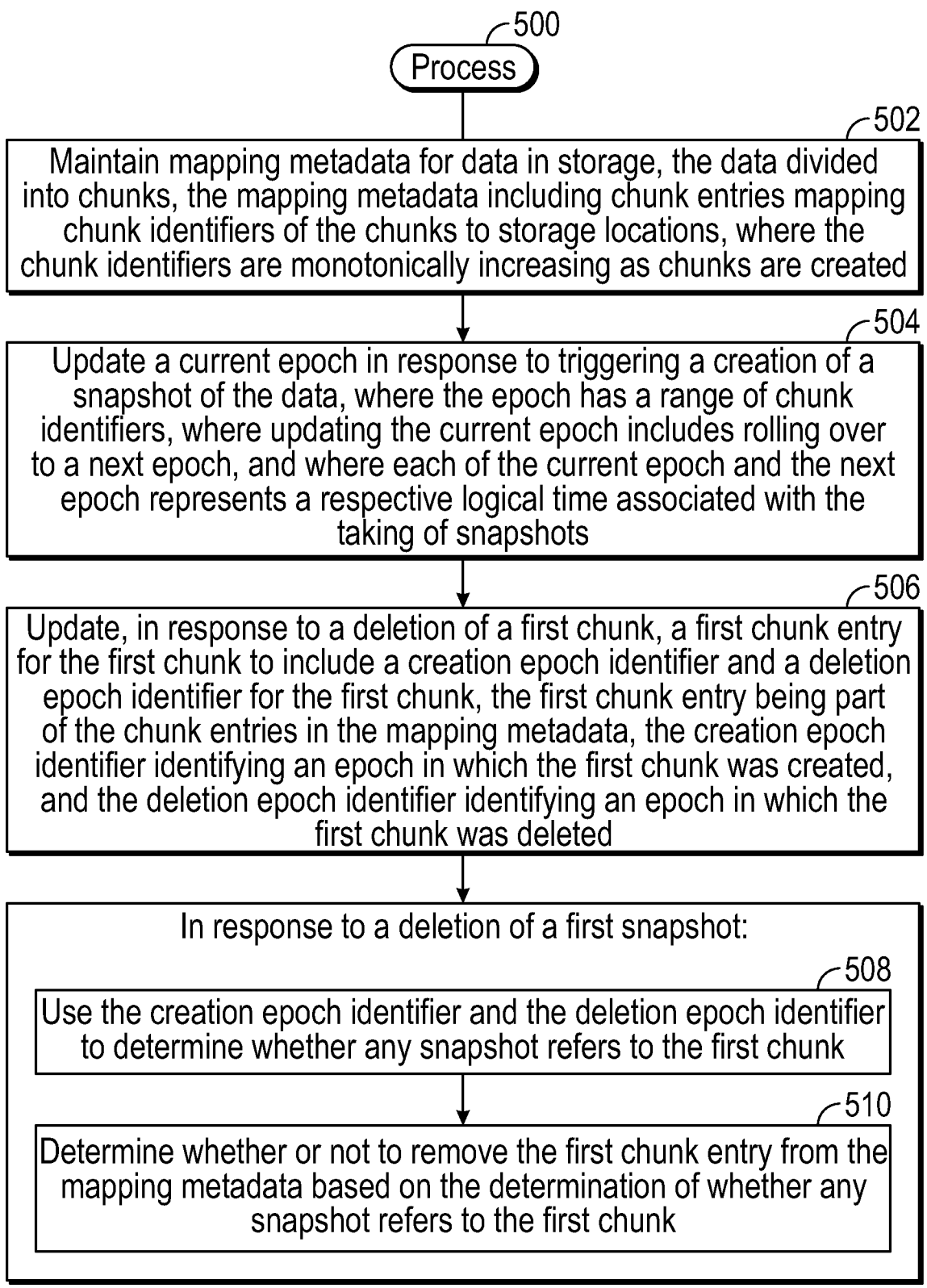
FIG. 5 is a flow diagram of a process according to some examples.

FIG. 5 is a flow diagram of a process 500 according to some examples.

The process 500 includes maintaining (at 502) mapping metadata for data in storage, the data divided into chunks, the mapping metadata including chunk entries mapping chunk identifiers of the chunks to storage locations, where the chunk identifiers are monotonically increasing as chunks are created.

The process 500 includes updating (at 504) a current epoch in response to triggering a creation of a snapshot of the data, where the epoch has a range of chunk identifiers, where updating the current epoch includes rolling over to a next epoch, and where each of the current epoch and the next epoch represents a respective logical time associated with the taking of snapshots.

The process 500 includes updating (at 506), in response to a deletion of a first chunk, a first chunk entry for the first chunk to include a creation epoch identifier and a deletion epoch identifier for the first chunk, the first chunk entry being part of the chunk entries in the mapping metadata, the creation epoch identifier identifying an epoch in which the first chunk was created, and the deletion epoch identifier identifying an epoch in which the first chunk was deleted.

The process 500 includes performing tasks 508 and 510 in response to a deletion of a first snapshot of the multiple snapshots.

Task 508 includes using the creation epoch identifier and the deletion epoch identifier to determine whether any snapshot refers to the first chunk.

Task 510 includes determining whether or not to remove the first chunk entry from the mapping metadata based on the determination of whether any snapshot refers to the first chunk.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   maintain mapping metadata for data in storage, the data divided into chunks, the mapping metadata comprising chunk entries mapping chunk identifiers of the chunks to storage locations, wherein the chunk identifiers are monotonically increasing as chunks are created, and the chunks are immutable;
   update an epoch in response to triggering a creation of a snapshot of the data, the snapshot comprising a point-in-time representation of data, wherein multiple snapshots share references to at least one chunk;
   in response to a deletion of a first chunk, update a first chunk entry for the first chunk to include a creation epoch identifier and a deletion epoch identifier for the first chunk, the first chunk entry being part of the chunk entries in the mapping metadata, the creation epoch identifier identifying an epoch in which the first chunk was created, and the deletion epoch identifier identifying an epoch in which the first chunk was deleted, wherein each epoch comprises a range of chunk identifiers; and
   in response to a deletion of a first snapshot of the multiple snapshots, wherein the first snapshot is associated with a first epoch that is preceded by a predecessor epoch, identify chunk entries to remove, based on respective creation and deletion epoch identifiers, by traversing exclusively a subset of chunk entries having chunk identifiers in a traversal range starting after an end of a range of chunk identifiers of the predecessor epoch and ending at an end of a range of chunk identifiers of the first epoch.

2. The non-transitory machine-readable storage medium of claim 1, wherein the mapping metadata is part of a tree-structured index having a root node and leaf nodes, the leaf nodes containing the chunk entries, and the instructions comprise instructions to:
   use the creation and deletion epoch identifiers of the first chunk entry to determine whether to remove the first chunk entry from the mapping metadata,
   wherein removing the first chunk entry from the mapping metadata comprises removing the first chunk entry from a leaf node of the tree-structured index.

3. The non-transitory machine-readable storage medium of claim 2, wherein the tree-structured index is divided into plural segments associated with respective epochs, each segment of the plural segments of the tree-structured index comprising chunk entries with chunk identifiers within a respective range of chunk identifiers.

4. The non-transitory machine-readable storage medium of claim 2, wherein using the creation and deletion epoch identifiers of the first chunk entry to determine whether to remove the first chunk entry from the mapping metadata comprises:
   comparing the creation epoch identifier of the first chunk entry to a predecessor epoch identifier identifying the predecessor epoch of the first epoch associated with the first snapshot that is being deleted, and
   comparing the deletion epoch identifier of the first chunk entry to a successor epoch identifier identifying a successor epoch of the first epoch associated with the first snapshot that is being deleted.

5. The non-transitory machine-readable storage medium of claim 4, wherein the predecessor epoch is a most recent predecessor epoch, before the first epoch, for which metadata of that epoch is being or has been committed to the storage.

6. The non-transitory machine-readable storage medium of claim 5, wherein the comparing of the creation epoch identifier to the predecessor epoch identifier comprises determining whether the creation epoch identifier is greater than the predecessor epoch identifier.

7. The non-transitory machine-readable storage medium of claim 6, wherein a determination to remove the first chunk entry from the mapping metadata is based on determining that the creation epoch identifier of the first chunk entry is greater than the predecessor epoch identifier.

8. The non-transitory machine-readable storage medium of claim 7, wherein a determination to not remove the first chunk entry from the mapping metadata is based on determining that the creation epoch identifier of the first chunk entry is not greater than the predecessor epoch identifier.

9. The non-transitory machine-readable storage medium of claim 4, wherein the successor epoch is a least recent successor epoch, after the first epoch, for which metadata of that epoch is being or has been committed to the storage.

10. The non-transitory machine-readable storage medium of claim 9, wherein the comparing of the deletion epoch identifier to the successor epoch identifier comprises determining whether the deletion epoch identifier is less than or equal to the successor epoch identifier.

11. The non-transitory machine-readable storage medium of claim 10, wherein a determination to remove the first chunk entry from the mapping metadata is based on determining that the deletion epoch identifier is less than or equal to the successor epoch identifier.

12. The non-transitory machine-readable storage medium of claim 11, wherein a determination to not remove the first chunk entry from the mapping metadata is based on determining that the deletion epoch identifier is not less than or equal to the successor epoch identifier.

13. The non-transitory machine-readable storage medium of claim 1, wherein the updating of the epoch comprises:
   changing a state of the epoch from a state in which data updates for the epoch are allowed to a state in which the data updates are committed to the storage, and
   rolling over from the epoch to a next epoch.

14. A system comprising:
   a hardware processor; and
   a non-transitory storage medium storing instructions executable on the hardware processor to:
      maintain mapping metadata for data in storage, the data divided into chunks, the mapping metadata comprising chunk entries mapping chunk identifiers of the chunks to storage locations, wherein the chunk identifiers are monotonically increasing as chunks are created;

associate epochs with respective snapshots of the data, wherein each epoch of the epochs comprises epoch metadata including a respective range of chunk identifiers and an epoch state;

update a current epoch of the epochs in response to triggering a creation of a snapshot of the data, the snapshot comprising a point-in-time representation of data, wherein updating the current epoch comprises triggering a commitment of data updates of the current epoch to the storage, and rolling over to a next epoch;

in response to a deletion of a first chunk, update a first chunk entry for the first chunk to include a creation epoch identifier and a deletion epoch identifier for the first chunk, the first chunk entry being part of the chunk entries in the mapping metadata, the creation epoch identifier identifying an epoch in which the first chunk was created, and the deletion epoch identifier identifying an epoch in which the first chunk was deleted; and in response to a deletion of a first snapshot of the snapshots, wherein the first snapshot is associated with a first epoch that is preceded by a predecessor epoch, identify chunk entries to remove, based on respective creation and deletion epoch identifiers, by traversing exclusively a subset of chunk entries having chunk identifiers in a traversal range starting after an end of the range of chunk identifiers of the predecessor epoch and ending at an end of the range of chunk identifiers of the first epoch.

15. The system of claim 14, wherein prior to the update of the first chunk entry, the first chunk entry includes the creation epoch identifier but does not include the deletion epoch identifier.

16. The system of claim 14, wherein the instruction include instruction to, in response to deletion of the first snapshot, use the creation epoch identifier and the deletion epoch identifier to determine whether to remove the first chunk entry from the mapping metadata, comprising:

comparing the creation epoch identifier to a predecessor epoch identifier identifying the predecessor epoch, and comparing the deletion epoch identifier to a successor epoch identifier identifying a successor epoch of the first epoch associated with the first snapshot that is being deleted.

17. A method of a system comprising a hardware processor, comprising:

maintaining mapping metadata for data in storage, the data divided into chunks, the mapping metadata comprising chunk entries mapping chunk identifiers of the chunks to storage locations, wherein the chunk identifiers are monotonically increasing as chunks are created;

updating a current epoch in response to triggering a creation of a snapshot of the data, the snapshot comprising a point-in-time representation of data, wherein the current epoch has a range of chunk identifiers, updating the current epoch comprises rolling over to a next epoch, and each of the current epoch and the next epoch represents a respective logical time associated with taking of snapshots;

in response to a deletion of a first chunk, update a first chunk entry for the first chunk to include a creation epoch identifier and a deletion epoch identifier for the first chunk, the first chunk entry being part of the chunk entries in the mapping metadata, the creation epoch identifier identifying an epoch in which the first chunk was created, and the deletion epoch identifier identifying an epoch in which the first chunk was deleted; and in response to a deletion of a first snapshot of the snapshots, wherein the first snapshot is associated with a first epoch that is preceded by a predecessor epoch:
identifying chunk entries to remove, based on respective creation and deletion epoch identifiers, exclusively among a subset of chunk entries having chunk identifiers in a traversal range starting after an end of the range of chunk identifiers of the predecessor epoch and ending at an end of the range of chunk identifiers of the first epoch.

18. The method of claim 17, further comprising:

in response to the deletion of the first snapshot of the snapshots:

use the creation and deletion epoch identifiers of the first chunk entry to determine whether any snapshot refers to the first chunk, and determine whether or not to remove the first chunk entry from the mapping metadata based on the determination of whether any snapshot refers to the first chunk.

19. The method of claim 17, wherein the identifying chunk entries to remove in response to the deletion of the first snapshot comprises traversing exclusively the subset of chunk entries having chunk identifiers in the traversal range to identify chunk entries to remove based on respective creation and deletion epoch identifiers.

* * * * *